United States Patent
Yasrebi et al.

(10) Patent No.: US 8,223,630 B2
(45) Date of Patent: Jul. 17, 2012

(54) SYSTEM FOR MONITORING OPERATIONS OF AN ENUM SYSTEM

(75) Inventors: Mehrad Yasrebi, Austin, TX (US); Bernard Ku, Austin, TX (US); Chaoxin C. Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1375 days.

(21) Appl. No.: 11/739,375

(22) Filed: Apr. 24, 2007

(65) Prior Publication Data

US 2008/0267075 A1  Oct. 30, 2008

(51) Int. Cl.
*H04J 1/16* (2006.01)
*H04L 12/28* (2006.01)
*G06F 11/00* (2006.01)

(52) U.S. Cl. ............. 370/221; 370/356; 726/22
(58) Field of Classification Search .......... None
See application file for complete search history.

(56) References Cited

U.S. PATENT DOCUMENTS

| | | | | |
|---|---|---|---|---|
| 5,323,444 | A * | 6/1994 | Ertz et al. | 379/45 |
| 6,401,223 | B1 * | 6/2002 | DePenning | 714/42 |
| 6,775,534 | B2 * | 8/2004 | Lindgren et al. | 455/404.1 |
| 6,807,409 | B1 * | 10/2004 | Davidson et al. | 455/406 |
| 6,968,050 | B1 * | 11/2005 | Pershan et al. | 379/196 |
| 7,116,967 | B2 * | 10/2006 | Kauppinen et al. | 455/404.1 |
| 8,050,395 | B2 * | 11/2011 | Yasrebi et al. | 379/221.03 |
| 2002/0111159 | A1 * | 8/2002 | Faccin et al. | 455/422 |
| 2002/0163906 | A1 * | 11/2002 | Diachina et al. | 370/349 |
| 2003/0147519 | A1 * | 8/2003 | Jain et al. | 379/211.02 |
| 2004/0001572 | A1 * | 1/2004 | Chin et al. | 379/45 |
| 2004/0022366 | A1 * | 2/2004 | Ferguson et al. | 379/1.01 |
| 2004/0122934 | A1 * | 6/2004 | Westman et al. | 709/223 |
| 2004/0190522 | A1 * | 9/2004 | Aerrabotu et al. | 370/395.3 |
| 2004/0198310 | A1 * | 10/2004 | Aerrabotu et al. | 455/404.1 |
| 2004/0199914 | A1 * | 10/2004 | Aerrabotu et al. | 718/100 |
| 2005/0025294 | A1 * | 2/2005 | Matsuhashi et al. | 379/88.17 |
| 2005/0083911 | A1 * | 4/2005 | Grabelsky et al. | 370/352 |
| 2005/0105464 | A1 * | 5/2005 | Acharya et al. | 370/229 |
| 2005/0286695 | A1 * | 12/2005 | Pershan et al. | 379/196 |
| 2006/0063510 | A1 * | 3/2006 | Wills et al. | 455/406 |
| 2006/0174009 | A1 * | 8/2006 | Martiquet et al. | 709/227 |
| 2006/0182029 | A1 * | 8/2006 | Kealy et al. | 370/230 |
| 2006/0272019 | A1 | 11/2006 | Addepalli | |
| 2007/0022289 | A1 * | 1/2007 | Alt et al. | 713/168 |
| 2007/0032219 | A1 * | 2/2007 | Rudolf et al. | 455/404.1 |
| 2007/0061397 | A1 * | 3/2007 | Gregorat et al. | 709/203 |
| 2007/0162599 | A1 * | 7/2007 | Nguyen | 709/225 |
| 2008/0222724 | A1 * | 9/2008 | Ormazabal et al. | 726/23 |
| 2008/0279362 | A1 * | 11/2008 | Yasrebi et al. | 379/221.06 |
| 2009/0310484 | A1 * | 12/2009 | Sisalem et al. | 370/230 |

* cited by examiner

*Primary Examiner* — Melanie Jagannathan
(74) *Attorney, Agent, or Firm* — Hanley, Flight and Zimmerman, LLC

(57) ABSTRACT

A system for monitoring operations of a Telephone Number Mapping (ENUM) system is disclosed. A system that incorporates teachings of the present disclosure may include, for example, an ENUM system having a controller element to monitor queries received from one or more network elements, detect one or more faults in the queries submitted by at least one among the one or more network elements, and prevent the at least one of the one or more network elements from submitting subsequent queries to the ENUM system. Additional embodiments are disclosed.

18 Claims, 3 Drawing Sheets

SYSTEM FOR MONITORING OPERATIONS OF AN ENUM SYSTEM

FIELD OF THE DISCLOSURE

The present disclosure relates generally to communication networks, and more specifically to a system for monitoring operations of a tElephone NUmber Mapping (ENUM) system.

BACKGROUND

ENUM is an internet Protocol (IP) telephony protocol that is used in Voice over IP (VoIP) peering for establishing multimedia sessions. An ENUM system can be used to map an international phone number to a domain name so that the telephone number can be associated with DNS (Domain Name System) services. The ENUM system can respond to telephone number queries in accordance with a designed data traffic capacity. A malfunctioning network element of an IP Multimedia Subsystem (IMS) network (e.g., a serving call session control function or S-CSCF) interacting with an ENUM system can adversely affect the performance of the ENUM system.

An excess of improper ENUM queries submitted by a malfunctioning S-CSCF can reduce ENUM response times. Malfunctions such as this can arise from a defective IMS network element, or from an unauthorized party altering the operations of an IMS network element by way of a security breach. Defective IMS network elements or security threats that attempt to slow down ENUM operations can compromise the service integrity of the IMS network.

A need therefore arises for a system for monitoring operations of an ENUM system.

DETAILED DESCRIPTION

Embodiments in accordance with the present disclosure provide a system for monitoring operations of an ENUM system.

In a first embodiment of the present disclosure, a computer-readable storage medium can have computer instructions for monitoring queries submitted to a Telephone Number Mapping (ENUM) system by one or more IP Multimedia Subsystem (IMS) network elements, detecting one or more faults in the queries submitted by at least one among the one or more IMS network elements, and preventing the at least one of the one or more IMS network elements from submitting subsequent queries to the ENUM system responsive to said faults exceeding a threshold.

In a second embodiment of the present disclosure, an ENUM system can have a controller element to monitor queries received from one or more network elements, detect one or more faults in the queries submitted by at least one among the one or more network elements, and prevent the at least one of the one or more network elements from submitting subsequent queries to the ENUM system.

In a third embodiment of the present disclosure, a Serving Call Session Control Function (S-CSCF) can have a controller element to discontinue submissions of interrogating queries to an ENUM system responsive to a request from a security system that detects one or more faults in the interrogating queries exceeding a fault threshold.

In a fourth embodiment of the present disclosure, a method can involve preventing at least one IMS network element from submitting faulted data to another IMS network element responsive to a frequency of occurrence of the faulted data exceeding a threshold.

Figure 1:
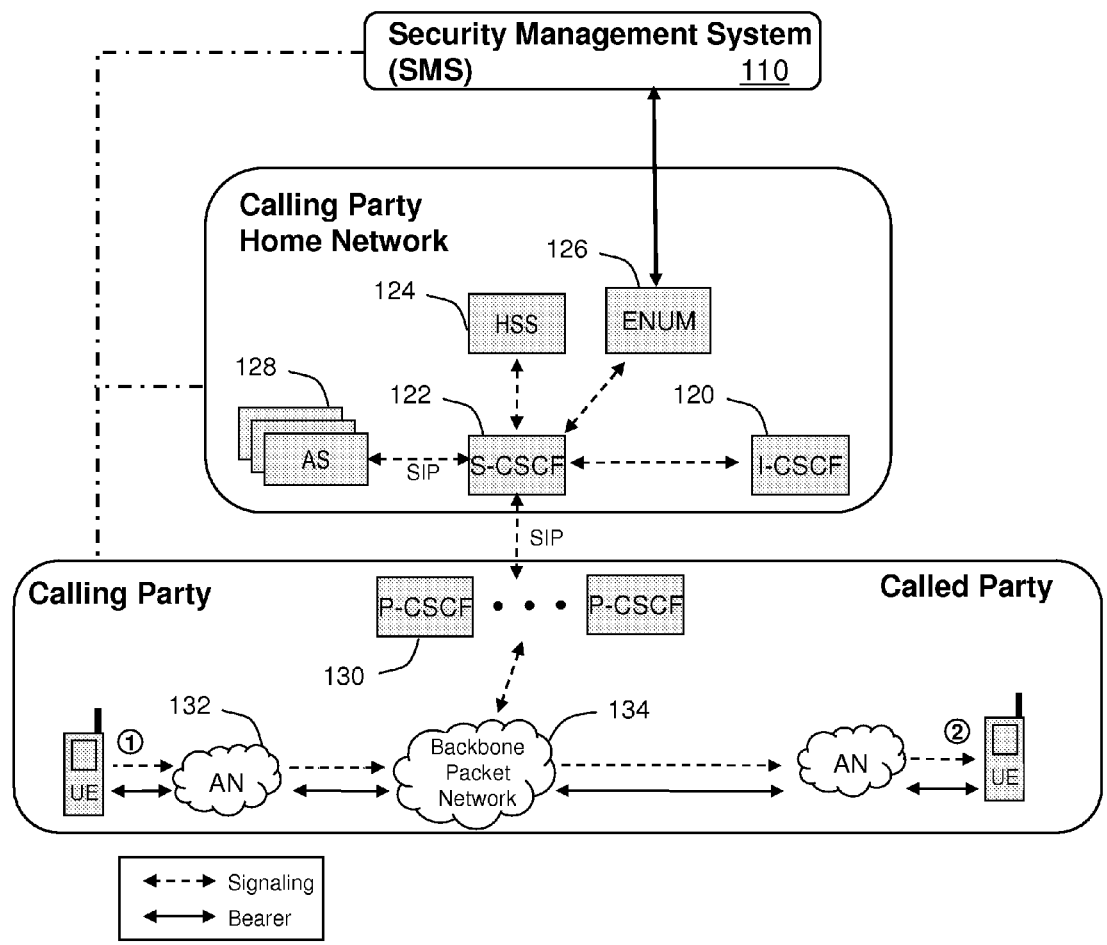
FIG. 1 depicts an exemplary embodiment of an IP Multimedia Subsystem (IMS) network.

FIG. 1 depicts an exemplary embodiment of an IP Multimedia Subsystem (IMS) network 100. The IMS network 100 can comprise among other things a Proxy Call Session Control Function (P-CSCF) 130, an Interrogating CSCF (I-CSCF) 120, a Serving CSCF (S-CSCF) 122, a Home Subscriber Server (HSS) 124, a tElephone NUmber Mapping (ENUM) system 126, an Application Server (AS) 128, an Access Network (AN) 132, a backbone packet-switched network 134, and two IMS User Equipment (UE) devices denoted by the IMS UE 1 and IMS UE 2. Signaling and bearer activities are depicted by dashed versus solid lines between IMS terminal devices. More than the number of IMS UE devices shown can be present in the IMS network. Moreover, the IMS UE devices can also connect to other circuit switched or packed switched networks, though not shown.

ENUM is a standard adopted by the Internet Engineering Task Force (IETF) that uses the domain name system (DNS) to map telephone numbers to Web addresses or uniform resource locators (URL) It is best suited to offer services that expand the means to complete calls over IP networks. It provides a user with a domain name on an E.164 telephone number server in order to associate a common international telephone number with a uniform resource identifier or URI and provides other DNS-related services. The ENUM is necessary for establishment of a Voice Over Internet Protocol (VoIP) session using the common telephone number to address the callee, such as a VoIP call between IMS UE 1 and IMS UE 2. DNS can be used to look up Internet addresses for services such as SIP VoIP telephony. Naming Authority Pointer or NPTR records are used for translating E.164 addresses to SIP URI addresses.

The ENUM system 126 can interact cooperatively with one or more Domain Name Service (DNS) servers and one or more lightweight directory access protocol (LDAP) servers organized by zones. The LDAP servers can store resource records (RRs) in an object-oriented format such as by classes and corresponding zones. With classes and zones, RRs can be organized by a country code, a Numbering Plan Area (NPA), and/or a Numeric Numbering Exchange (NXX). As an example, an ENUM record can be broken into a number of zones such as by country (country code "1"), NPA ("222"), and/or NXX ("333").

A security management system 110 can be used to monitor operations of the ENUM system 126 and associated IMS network elements and employ mitigating steps when malfunctions are detected that can adversely affect the performance of the IMS network 100.

The P-CSCF 130 is a Session Initiation Protocol (SIP) proxy serving as a first point of contact to an IMS UE. The I-CSCF 120 is a SIP proxy that can among other things query the HSS 124 to retrieve IMS UE location and route SIP calls to its assigned S-CSCF 122. The S-CSCF 122 is a SIP server that can handle SIP registrations, which allows it to bind the IMS UE device to an IMS home network. It can also decide which ASs 128 to forward a SIP message to in order to provide the services offered by the ASs. ASs 128 can also provide routing services using ENUM lookups, and can enforce the policy of a service provider of the IMS network 100. The ASs 128 host and execute value-added IMS services (e.g., Caller ID, Call waiting, Push To Talk, etc.).

The HSS 124 can serve as a master database that supports the IMS network 100 for handling calls. It can contain subscription information. It can also perform authentication and authorization of an IMS UE, and can provide information about the physical location of an IMS UE.

The ANs 128 can support wireline or wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. IMS UEs can represent residential or commercial fixed line IMS terminals as well as portable IMS devices such as cellular phones conforming to an IMS standard. The packet-switched backbone 134 can represent a packet network supporting any number of protocols such as IP, Multi-Protocol Label Switching (MPLS), Asynchronous Transfer Mode/Frame Relay (ATM/FR), and so on.

Figure 2:
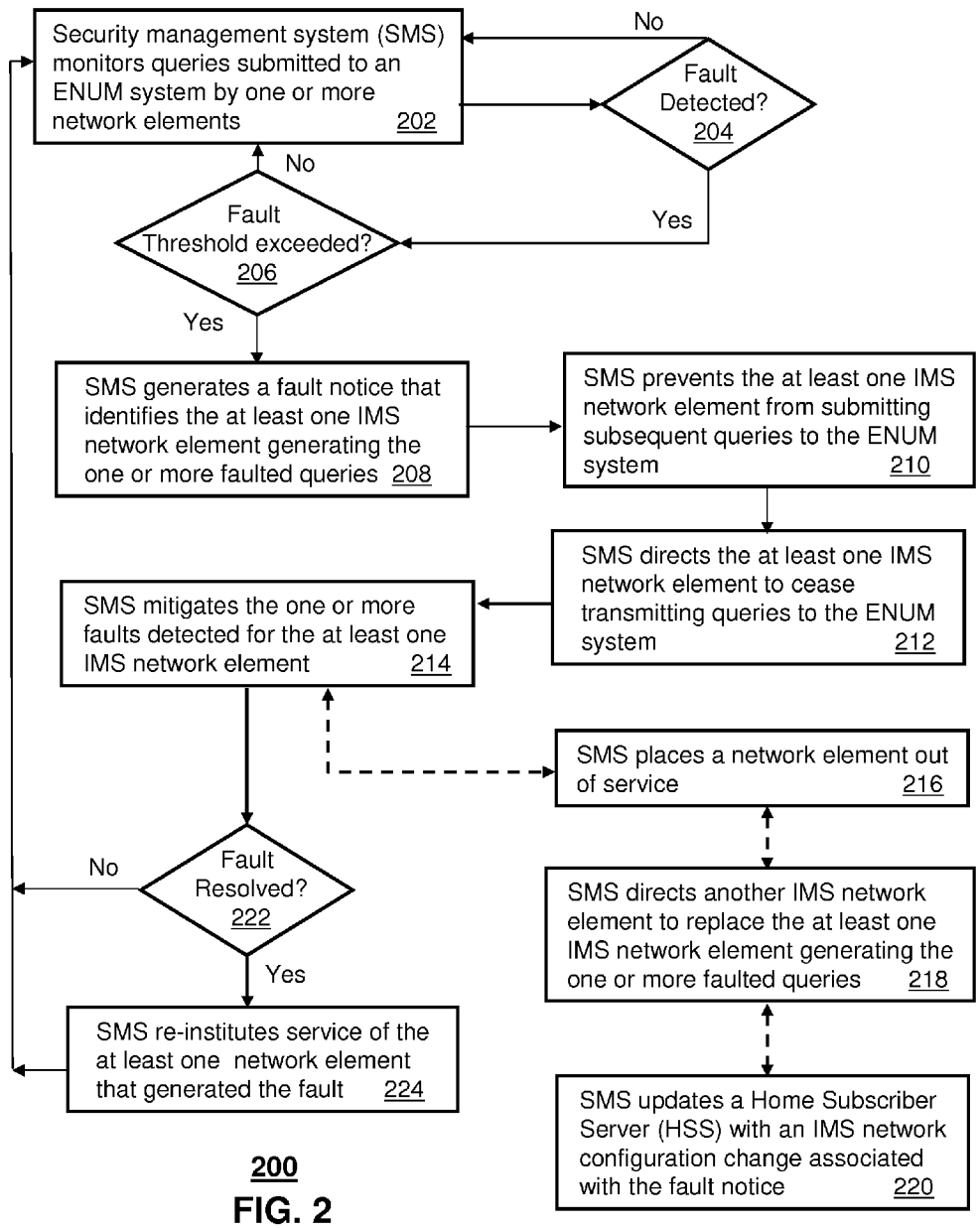
FIG. 2 depicts an exemplary method operating in portions of an IMS network.

FIG. 2 depicts an exemplary method 200 operating in portions of the IMS network 100. Method 200 begins with step 202 in which the security management system 110 monitors queries submitted to the ENUM system 126 by one or more IP Multimedia Subsystem (IMS) network elements. As an example, in the IMS network 100 of FIG. 1, IMS UE 1 served by S-CSCF 122 may place a VoIP call to IMS UE 2 served by another S-CSCF. The S-CSCF 122 can submit to the ENUM system 126 an interrogating query for mapping a telephone number of IMS UE 2 to a SIP URI of IMS UE 2. The ENUM system 126 can look up and respond to the S-CSCF 122 with the SIP URI corresponding to the telephone number. Broadly speaking, the telephone number can be an E.164 number, a Session Initiated Protocol (SIP) Uniform Resource Indicator (URI), or an Internet Protocol (IP) address.

As shown in step 204, the security management system 110 can detect one or more faults in the queries submitted by at least one among the one or more IMS network elements. As an example, a fault can be an incorrectly formatted telephone number or a non-existent telephone number presented by the S-CSCF 122 to the ENUM system 126, referred to herein as a faulted query. A faulted query can therefore correspond to a query having at least one detectable fault. A faulted query can arise from an unauthorized misuse of an IMS network element that causes it to intentionally malfunction and thereby generate a fault, such as an incorrect telephone number, which can disable or adversely affect operations of the ENUM system 126. In common parlance this activity is referred to as a hacking operation directed by an unauthorized party. In such a case, the security management system 110 can associate the faulted query with a Denial of Service (DoS) attack.

In one arrangement, the security management system 110 can detect a fault if an IMS network element repeatedly submits inquires to the ENUM system 126 with the same valid telephone number (TN) to repeatedly establish a call. In another arrangement, the security management system 110 can detect a fault if an IMS network element repeatedly inquires the ENUM system 126 with the same valid TN and repeatedly disconnects the call after the call is established. For example, the security system 110 can detect a fault if the S-CSCF 122 repeatedly requests a SIP URI from the ENUM system 126 and prematurely terminates the call before it is connected. Similarly, the security management system 110 can detect a fault if an IMS network element repeatedly inquires the ENUM system 126 with invalid or non-existent TNs. In summary, the security management system 110 can be programmed to detect any anomalous interactions between the IMS network elements and the ENUM system 126. The aforementioned steps therefore are merely a few ways for detecting one or more faulted queries submitted by an IMS network element to the ENUM system 126.

The security management system 110, at step 206, can proceed to determine if any of the faults exceed a threshold. The security management system 110 can tabulate a number of faulted queries for the one or more IMS network elements based on the number of faults exceeding the threshold. In one exemplary configuration, the security management system 110 can establish a tolerance threshold for accepting incorrectly-formatted TNs per unit time and/or a tolerance threshold non-existent TNs per unit time. The security management system 110 can keep a running count, or log, of the faulted queries and a cause of the faulted queries. The log can identify the type of faulted query (e.g., incorrect number format, invalid number, non-existent number, erratic call set up behavior), the content of the faulted query, a time of the faulted query, or any other information associated with a delivery and reception of a faulted query. The log can also identify the number of calls, the number of terminated calls, the number of discontinued calls, lengths of time associated with the calls, the time of the calls, and any other activity associated with the calls.

In another arrangement, the security management system 110 can tabulate a number of faulted queries for each of the one or more IMS network elements. For example, the security management system 110 can determine the number of incorrectly-formatted interrogating queries sent by S-CSCFs in the IMS network 100. The security management system 110 can calculate an average number of offenses per unit of time for each IMS network element.

The security management system 110 can also identify an ENUM service layer associated with each interrogating query and a response capacity for the one or more IMS network elements for each service layer. For example, the ENUM services can be arranged in the following hierarchical order: international route mapping (e.g. country code), national route mapping (e.g. area code), regional route mapping (e.g. exchange), and intra-exchange route (e.g. mapping). The international route portion can serve to process international calls, while the national route portion can serve to process inter-operator calls. The regional route portion processes calls between regions served by a specific telephony operator, while the intra-exchange portion processes calls within a designated region. Thus calls can be in-resolved (i.e., processed within its own hierarchical level), or up or down resolved (i.e., processed between hierarchical levels).

The security management system 110 can also tabulate faults between hierarchical levels of the ENUM system 126. The security management system 110 can, for example, identify the ENUM service layer resolving the faulted query, the percentage of queries resolved in a current ENUM service layer, or the percentage of queries passed to a higher ENUM service layer based on designed response capacities. As one example, the security management system 100 can determine if interrogating queries from an S-CSCF result in the ENUM system 126 exceeding a response capacity at an ENUM service layer. The security management system 110 can tabulate the faults for each of the one or more IMS network elements by corresponding ENUM service layer.

If, at step 206, a faulted query exceeds a threshold, then the security management system 110 can proceed to step 208 to generate a fault notice that identifies an IMS network element generating the one or more faulted queries. The fault notice can identify the P-CSCF, the I-CSCF, the S-CSCF, the HSS, the AS, the AN, or a communication device registered operating in an IMS network as a source of the fault. As one example, the security management system 100 can transmit the fault notice to a service agent of the IMS network 100. The fault notice can identify at least one IMS network element generating faulted queries, and can also include descriptive information associated with faulted queries. The security management system 110 can also assert an alarm associated with the fault notice. The alarm can be a visual, audible, or tactile message that is generated by the ENUM system 126 or any other network element associated with an IMS application, such as the S-CSCF 122.

In one aspect, one or more faults detected in the queries of at least one IMS network element can cause the ENUM system 126 to generate a corresponding alarm associated with a Denial of Service (DoS). For example, the ENUM system 126 can respond with a DoS when a telephone number in a faulted query cannot be resolved to a SIP URI due to a malfunctioning or hacked S-CSCF that, for example, continually submits a faulty request to the ENUM system 126. When this happens, the security management system 110 can detect one or more faulted queries associated with a DoS attack and generate a fault notice that identifies an IMS network element generating the DoS attack.

At step 210, the security system 110 prevents at least one of the one or more IMS network elements generating the fault detected in steps 204-206 from submitting subsequent queries to the ENUM system 126 responsive to the faults exceeding a threshold. For instance, the security system 110 at step 212, can direct at least one IMS network element to cease transmitting queries to the ENUM system 126, thereby relieving the ENUM system 126 from responding to needless queries. At step 214, the security management system 110 can mitigate the one or more faults detected for the at least one IMS network element. As one part of the mitigation, at step 216, the security management system 110 can place an IMS network element out of service responsive to the faults exceeding the threshold. For example, the security system 110 can isolate the S-CSCF 120 and suspend its services. This is performed to prevent the ENUM system 126 from receiving faulted queries that reduce its performance. In another arrangement, as shown in step 218, the security management system 110 can direct another IMS network element to replace the IMS network element generating the one or more faulted queries. The security management system 110 can also update the Home Subscriber Server (HSS) with an IMS network configuration change associated with the fault notice, as seen in step 220.

Upon isolating the IMS network elements generating the faulted queries, or discontinuing offending services from said IMS network elements, common repairs can be applied to prevent further interruptions to the ENUM system 126. For example, a service agent of the IMS network 100 can be asked to investigate and perform diagnostic testing on the affected IMS network element. If the problem is severe and unrelated to a security breach, the IMS network element may have to be replaced. Alternatively, a reset or reprogramming of the IMS network element may be sufficient to eliminate the malfunction. In this instance, the security management system 110 can, at step 222, determine whether the fault is resolved by performing its own testing of the IMS network element believed to be repaired. For example, the security management system 110 can gradually enable services of the affected IMS network element and check the log to determine if the number of faulted queries has decreased or has been eliminated.

In another embodiment, the security management system 110 can inform an affected IMS network element generating the faulted queries that it is malfunctioning, and request the IMS network element to correct its actions. The security management system 110 can then monitor improvements in step 222 to determine if the IMS network element has autonomously reduced or remove the anomalous behavior. In yet another embodiment, the security management system 110 can take measures to correct one or more offending services of the IMS network element responsible for the faulted queries by, for example, blocking incorrect telephone numbers, and/or instituting a policy to limit a number of consecutive queries using the same telephone number.

If the fault is resolved, the security management system 110 at step 224 can be programmed to re-institute one or more services of the IMS network element that were previously placed out of service for generating one or more faulted queries. The security system 110 can also be programmed to validate that the faulted query has been mitigated, and can inform the ENUM system 126 to accept subsequent queries submitted by the previously affected IMS network element. The security system 110 can then continue to monitor the ENUM system 126, back at step 202, for subsequent faulted queries. If the fault is not resolved at step 222, the method 200 can proceed back to step 202 to monitor queries submitted to the ENUM system 126 to identify any other IMS network elements generating faulted queries and to take the corrective actions as previously described.

Upon reviewing the aforementioned embodiments, it would be evident to an artisan with ordinary skill in the art that said embodiments can be modified, reduced, or enhanced without departing from the scope and spirit of the claims described below. For example, the ENUM system 126 can validate interrogating queries and keep track of IMS network elements submitting faulted queries. The ENUM system can also be configured to ignore queries from offending IMS network elements and implement policies that limit the number of ENUM services provided to the offending IMS network elements. Moreover, the policies can be implemented among various operating systems and/or application levels, including IMS and non-IMS applications. Furthermore, the ENUM system 126 or any other IMS network element can selectively terminate and re-institute services for IMS network elements generating faulted queries based on ENUM service capacities.

In yet another embodiment, method 200 can be applied to protecting an IMS network element from other malfunctioning or hacked IMS network elements. That is, the security management system 110 can be adapted to monitor data exchanges between IMS network elements and analyze the data for faults. A faulted data exchange can arise from a defective SIP message, defective content in the SIP message, a defective query message, defective content in the query message, or faults that can adversely affect a recipient IMS network element. In the present context, the IMS network element being monitored or protected can represent any network element shown in FIG. 1 (e.g., a P-CSCF 130, an I-CSCF 120, an S-CSCF 122, an HSS 124, an AS 128, an AN 132, or the communication device operating in an IMS network). From this process, the security management system 110 can tabulate a frequency of occurrence of faulted data generated by any of the IMS network elements in IMS network 100. When the frequency of occurrence of faulted data exceeds a threshold, the security management system 110 can apply a mitigation process to isolate the affected IMS network element from the IMS network element generating the faulted data.

Other suitable modifications can be applied to the present disclosure. Accordingly, the reader is directed to the claims for a fuller understanding of the breadth and scope of the present disclosure.

Figure 3:
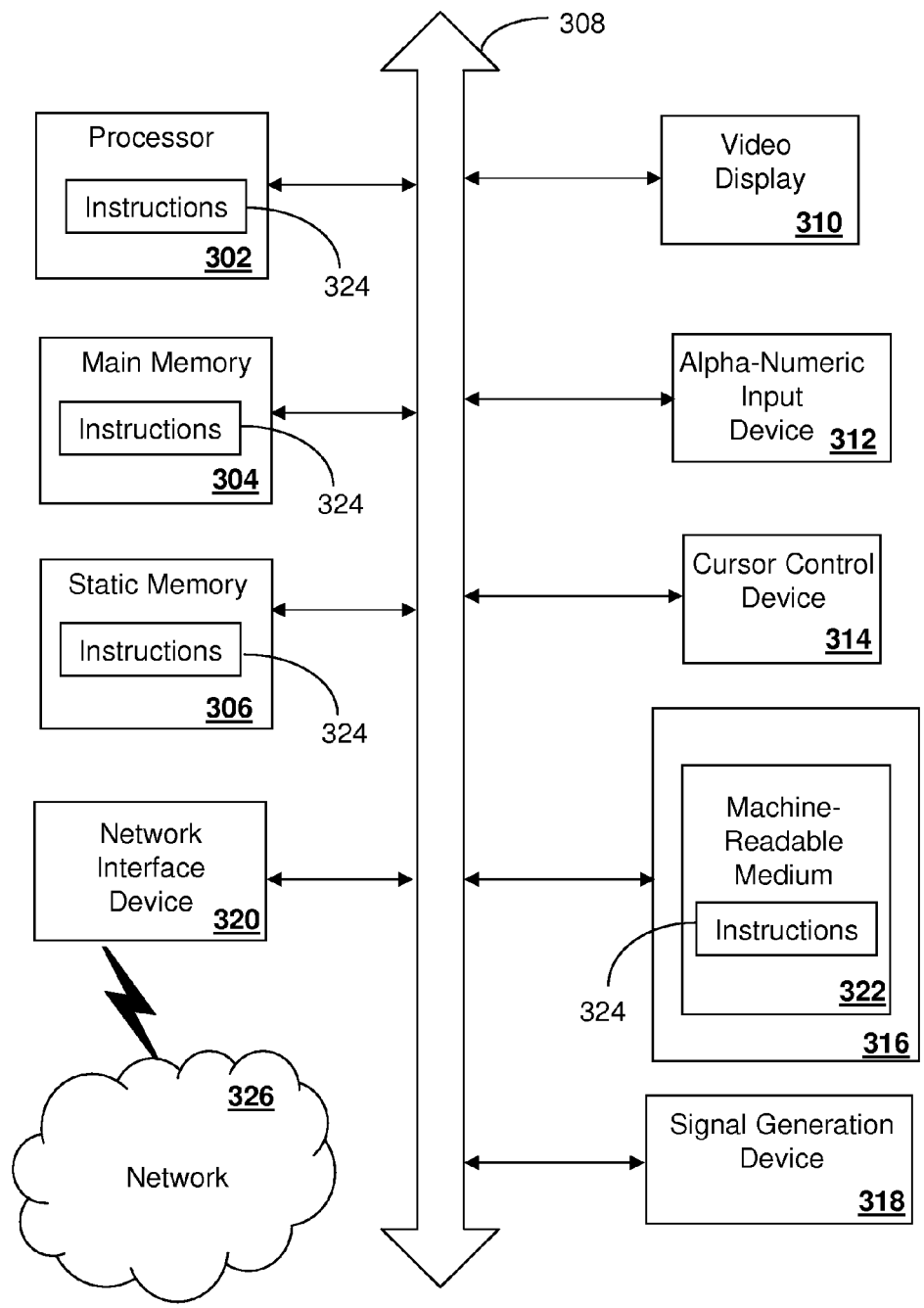
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a mass storage medium 316, a signal generation device 318 (e.g., a speaker or remote control) and a network interface device 320.

The mass storage medium 316 may include a computer-readable storage medium 322 on which is stored one or more sets of instructions (e.g., software 324) embodying any one or more of the methodologies or functions described herein, including those methods illustrated above. The computer-readable storage medium 322 can be an electromechanical medium such as a common disk drive, or a mass storage medium with no moving parts such as Flash or like non-volatile memories. The instructions 324 may also reside, completely or at least partially, within the main memory 304, the static memory 306, and/or within the processor 302 during execution thereof by the computer system 300. The main memory 304 and the processor 302 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the computer-readable storage medium 322 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible computer-readable storage medium, excluding propagating signals, comprising computer instructions to at least:
cause a security management system to monitor queries submitted to a Telephone Number Mapping system by one or more Internet Protocol Multimedia Subsystem network elements, the security management system separate from the Telephone Number Mapping system and the Internet Protocol Multimedia Subsystem network elements;
cause the security management system to detect one or more faults in the queries submitted by at least one among the one or more Internet Protocol Multimedia Subsystem network elements;
cause the security management system to prevent the at least one of the one or more Internet Protocol Multimedia Subsystem network elements from submitting subsequent queries to the Telephone Number Mapping system in response to the faults exceeding a threshold, wherein the one or more faults detected in the queries cause the Telephone Number Mapping system to generate an alarm corresponding to a Denial of Service attack;
cause the security management system to direct another one of the Internet Protocol Multimedia Subsystem network elements to replace the at least one of the one or more Internet Protocol Multimedia Subsystem network elements; and
cause the security management system to instruct the at least one of the one or more Internet Protocol Multimedia Subsystem network elements to autonomously repair itself.

2. The storage medium of claim 1, wherein the one or more faults correspond to an incorrectly formatted telephone number or a non-existent telephone number.

3. The storage medium of claim 2, wherein a telephone number is at least one among an E.164 number, a Session Initiated Protocol Uniform Resource Indicator, or an Internet Protocol address.

4. The storage medium of claim 1, further comprising computer instructions to place the at least one Internet Protocol Multimedia Subsystem network element out of service in response to the faults exceeding the threshold.

5. The storage medium of claim 1, further comprising computer instructions to mitigate the one or more faults detected for the at least one Internet Protocol Multimedia Subsystem network element.

6. The storage medium of claim 1, wherein the instructions prevent the at least one Internet Protocol Multimedia Subsystem network element from submitting subsequent queries to the Telephone Number Mapping system by directing the at least one Internet Protocol Multimedia Subsystem network element to cease transmitting queries to the Telephone Number Mapping system.

7. The storage medium of claim 1, further comprising computer instructions to generate a fault notice to identify the at least one Internet Protocol Multimedia Subsystem network element generating the one or more faulted queries.

8. The storage medium of claim 7, further comprising computer instructions to transmit the fault notice to a service agent of an Internet Protocol Multimedia Subsystem network.

9. The storage medium of claim 7, further comprising computer instructions to update a Home Subscriber Server with an Internet Protocol Multimedia Subsystem network configuration change associated with the fault notice.

10. The storage medium of claim 1, wherein the at least one Internet Protocol Multimedia Subsystem network element is at least one of a Proxy Call Session Control Function, an Interrogating Call Session Control Function, a Serving Call Session Control Function, an Home Subscriber Server, an Application Server, an Access Network, or a communication device operating in an Internet Protocol Multimedia Subsystem network.

11. An apparatus, comprising:
a memory storing machine readable instructions; and
a processor to execute the instructions to:
cause a security management system to monitor queries received at a Telephone Number Mapping system from one or more network elements, the security management system separate from the Telephone Number Mapping system and from the one or more network elements;
cause the security management system to detect one or more faults in the queries submitted by at least one of the one or more network elements;
cause the security management system to submit an alarm to another system to prevent the at least one of the one or more network elements from submitting subsequent queries to the Telephone Number Mapping system, wherein the one or more faults detected in the queries cause the Telephone Number Mapping system to generate an alarm corresponding to a Denial of Service attack;

cause the security management system to direct another one of the network elements to replace the at least one of the one or more network elements; and cause the security management system to instruct the at least one of the one or more network elements to autonomously repair itself.

12. The apparatus of claim 11, wherein the controller element is to submit a request to the other system to disable the at least one network element from sending the one or more faulted queries.

13. The apparatus of claim 11, wherein the other system is to disable the at least one network element from sending subsequent queries to the Telephone Number Mapping system upon detecting that the one or more faults exceed a threshold.

14. The apparatus of claim 11, wherein the one or more faults correspond to an incorrectly formatted telephone number or a non-existent telephone number.

15. The apparatus of claim 14, wherein the incorrectly formatted telephone number or the non-existent telephone number is at least one of an E.164 number, a Session Initiated Protocol Uniform Resource Indicator, or an Internet Protocol address.

16. A method, comprising:
using a security management system to monitor data exchanged between a plurality of Internet Protocol Multimedia Subsystem network elements, the security management system separate from the plurality of Internet Protocol Multimedia Subsystem network elements and a Telephone Number Mapping system;
using the security management system to detect faulted data submitted by at least one of the Internet Protocol Multimedia Subsystem network elements;
using the security management system to detect a frequency of occurrence from a collection of faulted data submitted by the at least one Internet Protocol Multimedia Subsystem network element to another Internet Protocol Multimedia Subsystem network element;
using the security management system to prevent the at least one Internet Protocol Multimedia Subsystem network element from submitting subsequent faulted data in response to the frequency of occurrence of the faulted data exceeding a threshold, wherein the faulted data causes the Telephone Number Mapping system to generate an alarm corresponding to a Denial of Service attack;
using the security management system to direct another one of the Internet Protocol Multimedia Subsystem network elements to replace the at least one Internet Protocol Multimedia Subsystem network element; and
using the security management system to instruct the at least one Internet Protocol Multimedia Subsystem network element to autonomously repair itself.

17. The method of claim 16, wherein the Internet Protocol Multimedia Subsystem network element comprises one of a Telephone Number Mapping system, a Proxy Call Session Control Function, an Interrogating Call Session Control Function, a Serving Call Session Control Function, a Home Subscriber Server, an Application Server, an Access Network, or a communication device operating in an Internet Protocol Multimedia Subsystem network.

18. The method of claim 16, wherein the faulted data corresponds to a defective Session Initiated Protocol message, defective content in the Session Initiated Protocol message, a defective query message, or defective content in the query message.

* * * * *